US011967295B2

(12) United States Patent
Ishii

(10) Patent No.: US 11,967,295 B2
(45) Date of Patent: Apr. 23, 2024

(54) DISPLAY DRIVER AND DISPLAY DEVICE USING INDEPENDENT TEST POLARITY INVERSION SIGNAL

(71) Applicant: LAPIS Technology Co., Ltd., Yokohama (JP)

(72) Inventor: Hiroaki Ishii, Yokohama (JP)

(73) Assignee: LAPIS Technology Co., Ltd., Yokohama (JP)

(*) Notice: Subject to any disclaimer, the term of this patent is extended or adjusted under 35 U.S.C. 154(b) by 0 days.

(21) Appl. No.: 17/902,914

(22) Filed: Sep. 5, 2022

(65) Prior Publication Data

US 2023/0077595 A1 Mar. 16, 2023

(30) Foreign Application Priority Data

Sep. 13, 2021 (JP) ................................ 2021-148391

(51) Int. Cl.
*G09G 3/36* (2006.01)

(52) U.S. Cl.
CPC ... *G09G 3/3614* (2013.01); *G09G 2300/0823* (2013.01); *G09G 2310/0291* (2013.01); *G09G 2320/046* (2013.01)

(58) Field of Classification Search
CPC .... G09G 3/006; G09G 3/2092; G09G 3/2096; G09G 3/36; G09G 3/3611; G09G 3/3614; G09G 3/3648; G09G 3/3685–3696; G09G 2300/0823; G09G 2310/0243; G09G 2310/0254; G09G 2310/0256; G09G 2310/0264; G09G 2310/027; G09G 2310/0275; G09G 2310/0286–0294; G09G 2310/08; G09G 2320/046; G09G 2320/0693; G09G 2330/12; G09G 2370/04; G09G 2370/08–10; G02F 1/1309
See application file for complete search history.

(56) References Cited

U.S. PATENT DOCUMENTS

2004/0057001 A1* 3/2004 Kim .................... G09G 3/3651 349/123
2007/0030236 A1* 2/2007 Kim .................... G09G 3/3648 345/98

(Continued)

FOREIGN PATENT DOCUMENTS

JP 2006078507 3/2006

*Primary Examiner* — Keith L Crawley
(74) *Attorney, Agent, or Firm* — JCIPRNET

(57) ABSTRACT

A display driver includes: a conversion part which converts first to n-th display data pieces representing a brightness level of each pixel based on an image signal into first to n-th gradation voltages each having a voltage value corresponding to the brightness level and outputs them, where n is an integer of 2 or more; a polarity inversion signal generation circuit which generates a polarity inversion signal for prompting polarity inversion for each frame display period according to the image signal; a first external terminal which receives an operation mode signal representing a test mode or a normal mode; and a first selector which receives a test polarity inversion signal and the polarity inversion signal, selects and outputs the polarity inversion signal when the operation mode signal represents the normal mode, and selects and outputs the test polarity inversion signal when the operation mode signal represents the test mode.

9 Claims, 7 Drawing Sheets

(56) References Cited

U.S. PATENT DOCUMENTS

| | | | | |
|---|---|---|---|---|
| 2010/0328289 | A1* | 12/2010 | Enrin | H04N 5/70 345/87 |
| 2015/0287373 | A1* | 10/2015 | Xu | G09G 3/006 345/213 |
| 2015/0325200 | A1* | 11/2015 | Rho | G09G 3/3688 345/212 |
| 2017/0025081 | A1* | 1/2017 | Satoh | G09G 3/006 |
| 2020/0410950 | A1* | 12/2020 | Chen | G09G 3/3685 |
| 2021/0201756 | A1* | 7/2021 | Kim | G09G 3/2092 |

* cited by examiner

DISPLAY DRIVER AND DISPLAY DEVICE USING INDEPENDENT TEST POLARITY INVERSION SIGNAL

CROSS REFERENCE TO RELATED APPLICATIONS

This application claims priority under 35 USC 119 from Japanese Patent application 2021-148391 filed on Sep. 13, 2021, the disclosure of which is incorporated by reference herein.

BACKGROUND

Technical Field

The disclosure relates to a display driver that drives a display panel in response to an image signal and a display device having the display driver.

Related Art

In the display driver that drives a liquid crystal display panel, in order to prevent burn-in of the liquid crystal display panel, the polarity of the drive voltage output to multiple source lines of the liquid crystal display panel is inverted for each display line or for each frame period.

For example, such a display driver includes a DA conversion part that converts one data signal into a positive gradation voltage and a negative gradation voltage, respectively, and one of a positive gradation voltage and a switch that selects one of the positive gradation voltage and the negative gradation voltage according to the polarity inversion signal and outputs it to one output terminal (see, for example, Japanese Patent Application Laid-Open No. 2006-78507).

Further, in a test before the product shipment for the display driver, the characteristic variation of each voltage output with the polarity according to the polarity inversion signal is evaluated.

By the way, as a test before the product shipment for the display driver, the drive voltage output with the polarity according to the polarity inversion signal is compared with an expected value, and if the two do not match, a function test is performed to determine that the display driver to be tested has a failure. Therefore, when performing such a function test, the test performer needs to prepare a value of the drive voltage in consideration of the polarity based on the polarity inversion signal as an expected value.

The polarity inversion signal is a binary oscillation signal in which the state of logic level 0 or 1 is alternately switched every frame display period in synchronization with a vertical synchronization signal in the image signal, and is generated by a control IC called a timing controller (TCON). Specifically, the polarity inversion signal is generated by, for example, a counter that counts the number of pulses of the clock signal for a frame period in the TCON, a T flip-flop (hereinafter referred to as TFF) that operates in response to the vertical synchronization signal, or the like.

Here, in recent years, a display driver with a built-in TCON has been introduced, and even for such a display driver with a built-in TCON, there is a need to perform a function test using an expected values as a test before product shipment.

However, when the polarity inversion signal is generated by, for example, TFF, it is uncertain whether the logic level of the polarity inversion signal will be 0 or 1 after the power is turned on due to the configuration of the element. Therefore, since the polarity of the drive voltage that will be output from the display driver at the time of the function test cannot be known in advance, the test performer cannot prepare the expected value of the drive voltage.

Therefore, it is conceivable that a TFF with a reset terminal is adopted as the TFF, and by resetting this TFF from a reset external terminal of the display driver at the preparation stage for performing the function test, the state of the polarity inversion signal is specified as logic level 0 or 1.

However, in addition to this TFF, multiple flip-flops (hereinafter, simply referred to as FF), registers, and the like that are involved in the operation of the display driver are connected to the reset external terminal of the display driver.

Therefore, if a reset is applied, the holding contents of the multiple FFs and registers will also be initialized, so after the reset, the holding contents of the multiple FFs and registers must be reset to the original state, which causes the test time to increase.

Therefore, the disclosure provides a display driver and a display device capable of shortening the test time at the time of product shipment.

SUMMARY

A display driver according to the disclosure includes: a conversion part which converts first to n-th display data pieces representing a brightness level of each pixel based on an image signal into first to n-th gradation voltages each having a voltage value corresponding to the brightness level, and outputs the first to n-th gradation voltages, where n is an integer of 2 or more; a polarity inversion signal generation circuit which generates a polarity inversion signal for prompting polarity inversion for each frame display period according to the image signal; a first external terminal which receives an operation mode signal representing a test mode or a normal mode; and a first selector which receives a test polarity inversion signal for prompting polarity inversion and the polarity inversion signal, selects and outputs the polarity inversion signal when the operation mode signal represents the normal mode, and selects and outputs the test polarity inversion signal when the operation mode signal represents the test mode. The conversion part inverts a polarity of the voltage value of each of the output first to n-th gradation voltages according to a signal output by the first selector from among the test polarity inversion signal and the polarity inversion signal.

Further, a display device according to the disclosure includes: a display panel comprising first to n-th source lines, where n is an integer of 2 or more; and a display driver which generates first to n-th drive voltages based on an image signal and supplies the first to n-th drive voltages to the first to n-th source lines of the display panel. The display driver includes: a conversion part which converts first to n-th display data pieces representing a brightness level of each pixel based on the image signal into first to n-th gradation voltages each having a voltage value corresponding to the brightness level, and outputs the first to n-th gradation voltages; an output amplifier part which generates n voltages obtained by amplifying each of the first to n-th gradation voltages as the first to n-th drive voltages; a polarity inversion signal generation circuit which generates a polarity inversion signal for prompting polarity inversion for each frame display period according to the image signal; a first external terminal which receives an operation mode signal representing a test mode or a normal mode; and a first selector which receives a test polarity inversion signal for prompting polarity inversion and the polarity inversion signal, selects and outputs the polarity inversion signal when the operation mode signal represents the normal mode, and selects and outputs the test polarity inversion signal when the operation mode signal represents the test mode. The conversion part inverts a polarity of the voltage value of each of the output first to n-th gradation voltages according to a signal output by the first selector from among the test polarity inversion signal and the polarity inversion signal.

Effects

According to the disclosure, in the test mode, the polarity of the drive voltage is switched by the test polarity inversion signal instead of the polarity inversion signal generated by the polarity inversion signal generation circuit included in the display driver. By using the test polarity inversion signal, it is possible to set the polarity of the drive voltage output from the display driver to the polarity intended by the test performer without resetting the display driver in the test preparation stage.

In this way, the test performer may specify the expected value of the drive voltage output from the display driver. Therefore, it is possible to shorten the test time compared with a display driver which needs to reset each FF and register group in order to specify the expected value in the test preparation stage.

DESCRIPTION OF EMBODIMENTS

Hereinafter, embodiments of the disclosure will be described in detail with reference to the drawings.

First Embodiment

Figure 1:
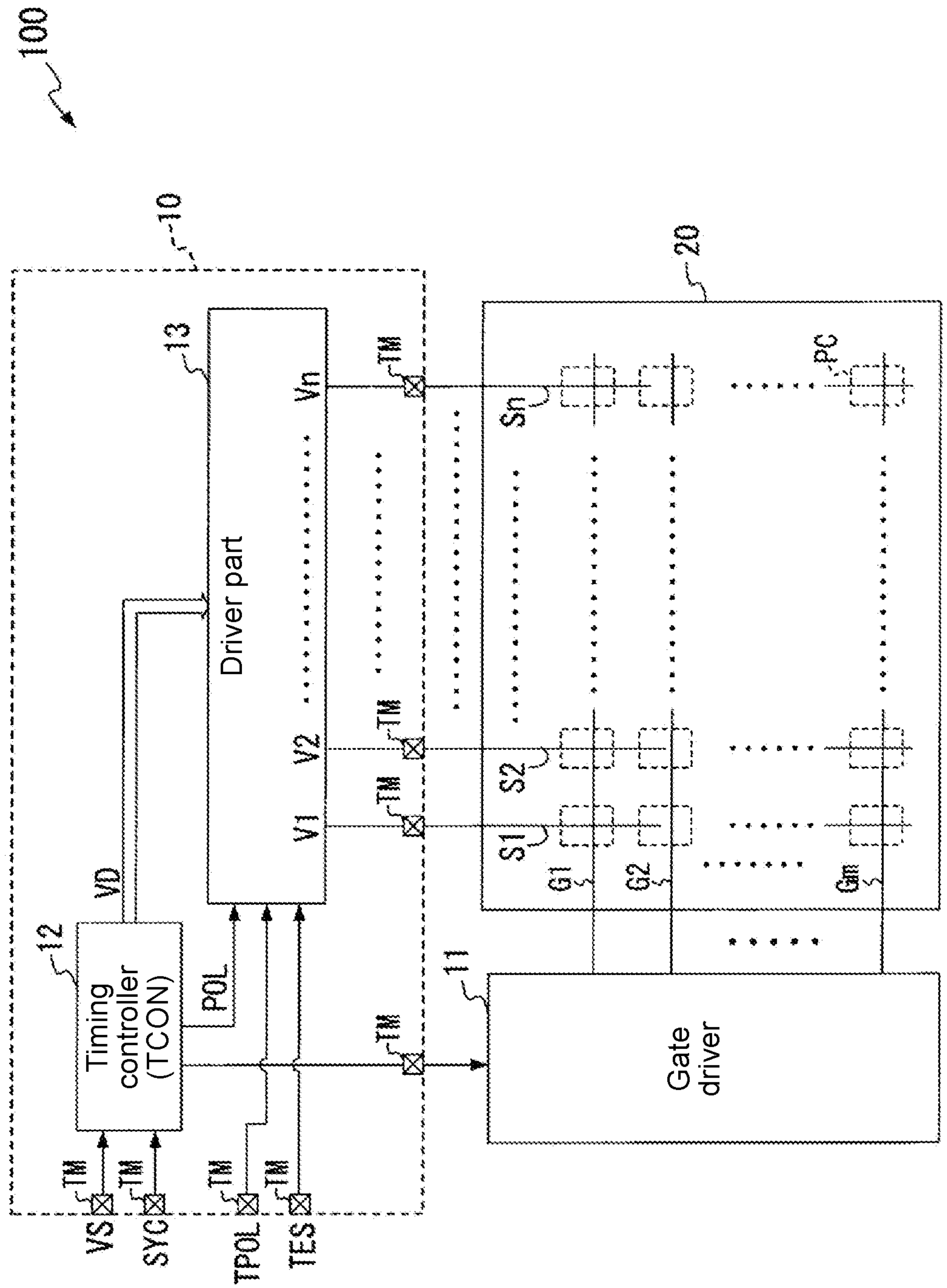
FIG. 1 is a block diagram showing a configuration of a display device 100 as a first embodiment of a display device including a display driver according to the disclosure.

FIG. 1 is a block diagram showing a configuration of a display device 100 as a first embodiment of a display device including a display driver according to the disclosure.

As shown in FIG. 1, the display device 100 includes a source driver 10, a gate driver 11, and a display panel 20.

The display panel 20 is an image display panel including, for example, a liquid crystal display panel. The display panel 20 is formed with gate lines G1 to Gm (m is an integer of 2 or more) extending in the horizontal direction of the two-dimensional screen and source lines S1 to Sn (n is a natural number of 2 or more) extending in the vertical direction of the two-dimensional screen. A display cell PC serving as a pixel is formed in the region of each intersection of the source line and the gate line, that is, the region surrounded by the broken line in FIG. 1.

The source driver 10 is formed on a single or multiple semiconductor IC chips.

The source driver 10 receives an image signal VS, a synchronization signal (horizontal and vertical synchronization signal) SYC, an operation mode signal TES, and a test polarity inversion signal TPOL from the outside of the semiconductor IC chip via multiple external terminals TM formed on the semiconductor IC chip.

The source driver 10 supplies a horizontal synchronization signal representing the timing for each horizontal scanning period to the gate driver 11 via the external terminal TM according to the synchronization signal SYC.

Further, the source driver 10 generates drive voltages V1 to Vn having voltage values corresponding to the brightness levels of each pixel for each horizontal scanning period according to the image signal VS and the synchronization signal SYC, and supplies each of them to the source lines S1 to Sn of the display panel 20 via the external terminal TM.

The gate driver 11 sequentially supplies a gate line selection signal to each of the gate lines G1 to Gm at the timing corresponding to the horizontal synchronization signal supplied from the source driver 10.

The source driver 10 will be described in detail below.

As shown in FIG. 1, the source driver 10 includes a timing controller 12 (hereinafter referred to as the TCON 12) and a driver part 13.

The TCON 12 supplies to the driver part 13 an image data signal VD including a display data signal, a horizontal and vertical synchronization signal, a data enable signal, a clock signal, and the like, which are based on the image signal VS and the synchronization signal SYC and include a series of display data pieces representing the brightness level of each pixel, for example, in 8 bits.

Further, the TCON 12 supplies the horizontal synchronization signal to the gate driver 11 via the external terminal TM.

Further, the TCON 12 generates a binary signal, in which, for example, the state of logic level 1 representing an odd frame and the state of logic level 0 representing an even frame are alternately switched for each frame display period at a timing synchronized with the synchronization signal SYC, as a polarity inversion signal POL, and supplies it to the driver part 13.

The driver part 13 receives the image data signal VD and the polarity inversion signal POL transmitted from the TCON 12, and also receives the operation mode signal TES and the test polarity inversion signal TPOL from the outside of the semiconductor IC chip via the external terminal TM.

Further, the operation mode signal TES is a binary (logic level 0 or 1) signal representing a normal mode in which the source driver 10 is normally operated or a test mode in which a test before product shipment is performed. For example, when the operation mode signal TES has a logic level 0, it represents the normal mode, and when it has a logic level 1, it represents the test mode.

The test polarity inversion signal TPOL is a signal for prompting polarity inversion, and is a binary signal having the state of logic level 1 representing an odd frame or the state of logic level 0 state representing an even frame.

Figure 2:
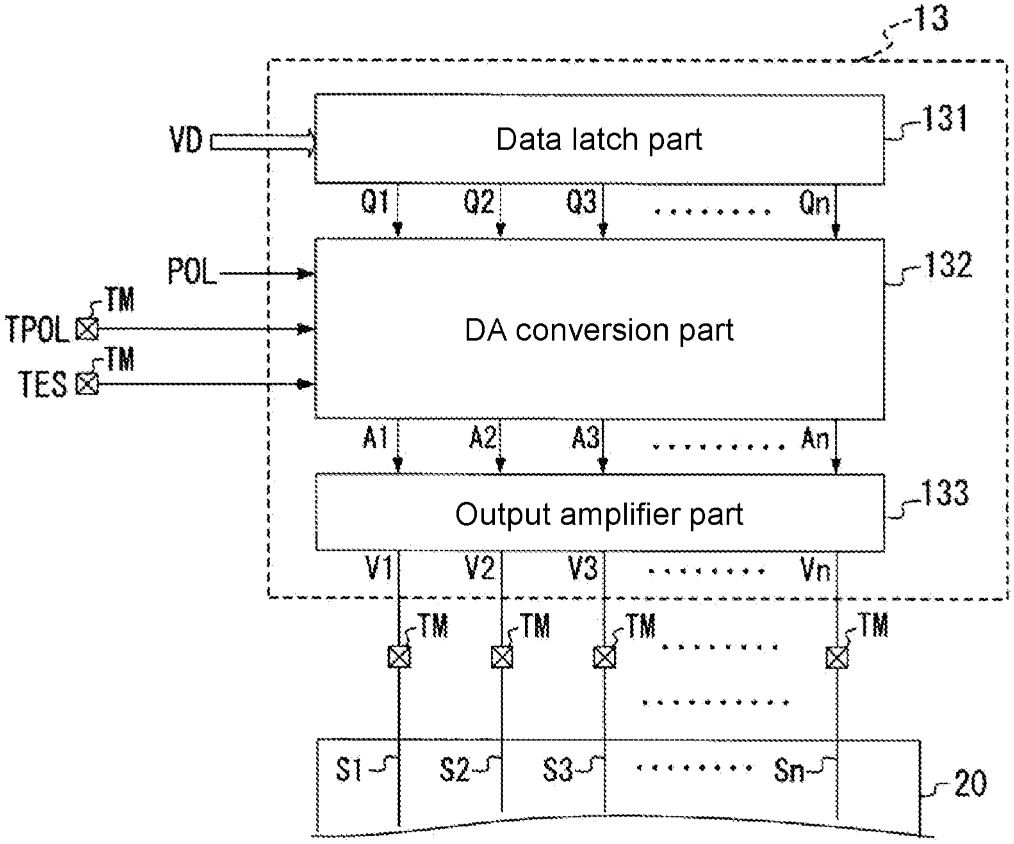
FIG. 2 is a block diagram showing an internal configuration of the driver part 13.

FIG. 2 is a block diagram showing an internal configuration of the driver part 13.

As shown in FIG. 2, the driver part 13 includes a data latch part 131, a DA conversion part 132, and an output amplifier part 133.

The data latch part 131 captures a series of display data pieces included in the image data signal VD according to the data enable signal at a timing synchronized with the clock signal included in the image data signal VD. Then, each time the data latch part 131 captures n display data pieces for one horizontal scanning period, the data latch part 131 supplies each piece of the display data Q1 to Qn to the DA conversion part 132.

The DA conversion part 132 converts each piece of the display data Q1 to Qn into a gradation voltage having a voltage value corresponding to the brightness level represented by each, and supplies the gradation voltages to the output amplifier part 133 as gradation voltages A1 to An. Further, when the operation mode signal TES represents the normal mode, the DA conversion part 132 switches the polarity of each gradation voltage A1 to An for each frame display period according to the polarity inversion signal POL supplied from the TCON 12. In addition, when the operation mode signal TES represents the test mode, the DA conversion part 132 switches the polarity of each gradation voltage A1 to An according to the test polarity inversion signal TPOL supplied via the external terminal TM.

The output amplifier part 133 outputs n voltages obtained by individually amplifying the gradation voltages A1 to An as drive voltages V1 to Vn to the source lines S1 to Sn of the display panel 20 via each of the corresponding external terminals TM.

The internal configuration of the DA conversion part 132 will be described below.

Figure 3:
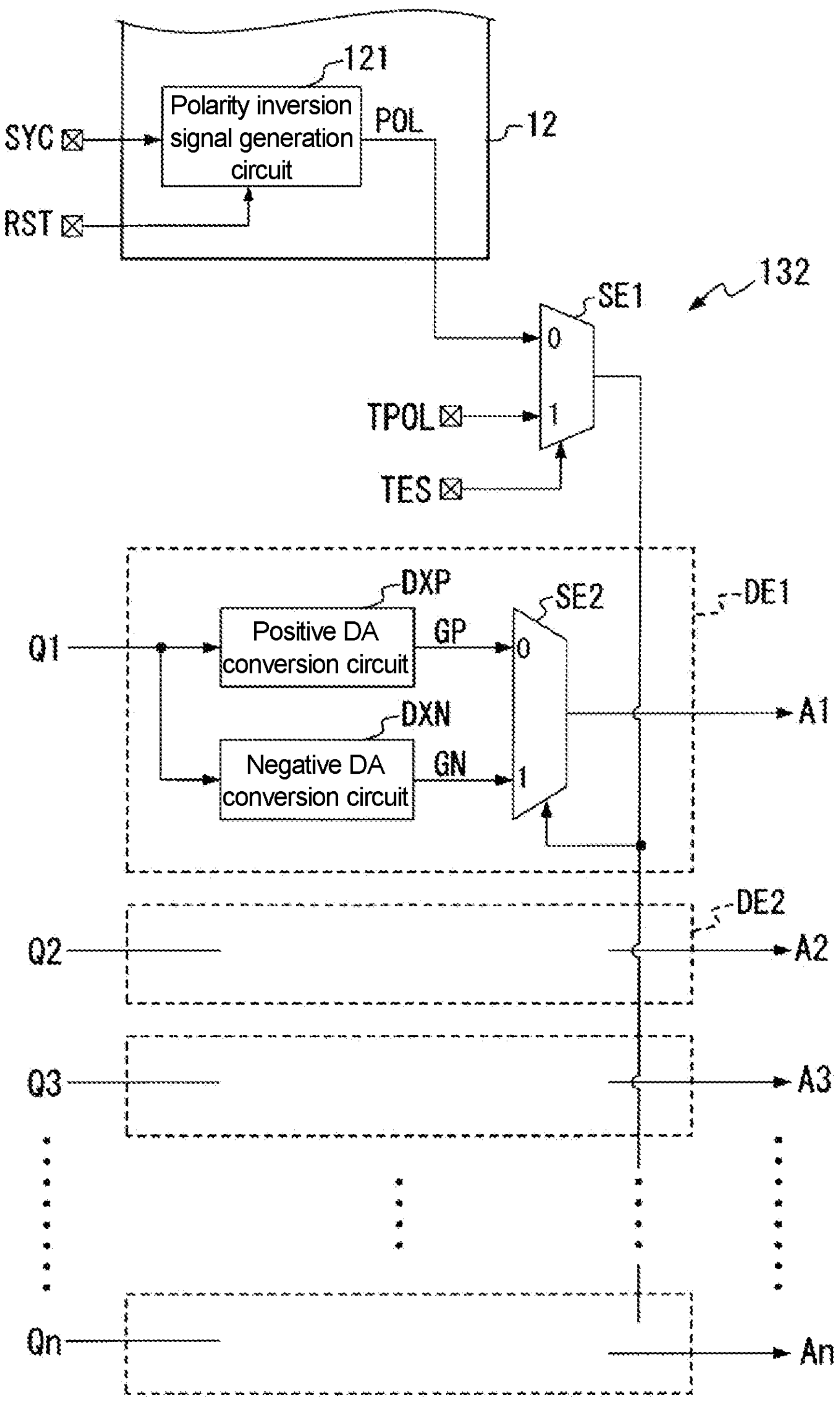
FIG. 3 is a block diagram showing an internal configuration of the DA conversion part 132.

FIG. 3 is a block diagram showing an example of an internal configuration of the DA conversion part 132.

As shown in FIG. 3, the DA conversion part 132 includes a selector SE1 and conversion blocks DE1 to DEn provided corresponding to the display data Q1 to Qn, respectively.

The selector SE1 receives the polarity inversion signal POL generated by the TCON 12 at the input terminal 0.

The TCON 12 includes, for example, a polarity inversion signal generation circuit 121 including a TFF, a counter, and the like, and the polarity inversion signal generation circuit 121 generates the polarity inversion signal POL. That is, the polarity inversion signal generation circuit 121 generates a signal that alternately repeats the states of logic level 0 and logic level 1 for each frame period in synchronization with the synchronization signal SYC supplied via the external terminal as the polarity inversion signal POL that prompts polarity inversion. Further, the polarity inversion signal generation circuit 121 initializes its own internal state according to the reset signal RST supplied via the external terminal, and initializes the state of the polarity inversion signal POL to one of the logic level 0 and the logic level 1.

When the operation mode signal TES represents the normal mode, the selector SE1 selects the polarity inversion signal POL from the polarity inversion signal POL and the test polarity inversion signal TPOL and outputs the polarity inversion signal POL. In addition, when the operation mode signal TES represents the test mode, the selector SE1 selects the test polarity inversion signal TPOL from the polarity inversion signal POL and the test polarity inversion signal TPOL and outputs the test polarity inversion signal TPOL. The polarity inversion signal POL or the test polarity inversion signal TPOL output from the selector SE1 is supplied to each of the conversion blocks DE1 to DEn.

Each of the conversion blocks DE1 to DEn includes the same internal configuration, that is, a positive DA conversion circuit DXP, a negative DA conversion circuit DXN, and a selector SE2, and by such a configuration, the display data Qx (x is an integer of 1 to n) received by each is converted into a gradation voltage Ax and output.

That is, the positive DA conversion circuit DXP converts the display data Qx into a positive gradation voltage GP having a positive voltage value corresponding to the brightness level represented by the display data Qx, and supplies it to the selector SE2.

The negative DA conversion circuit DXN converts the display data Qx into a negative gradation voltage GN having a negative voltage value corresponding to the brightness level represented by the display data Qx, and supplies it to the selector SE2.

The selector SE2 selects one of the positive gradation voltage GP and the negative gradation voltage GN based on the polarity inversion signal POL or the test polarity inversion signal TPOL output from the selector SE1, and outputs it as the gradation voltage Ax. For example, the selector SE2 selects the positive gradation voltage GP when the polarity inversion signal POL or the test polarity inversion signal TPOL represents an odd frame, and selects the negative gradation voltage GN when the polarity inversion signal POL or the test polarity inversion signal TPOL represents an even frame, and outputs the selected one as the gradation voltage Ax.

Therefore, in the DA conversion part 132, when the display data Q1 to Qn are converted into the gradation voltages A1 to An, and when the operation mode signal TES represents the normal mode, the polarities of the gradation voltages A1 to An are switched for each frame display period according to the polarity inversion signal POL generated by the TCON 12.

In addition, when the operation mode signal TES represents the test mode, the DA conversion part 132 switches the polarity of each gradation voltage A1 to An according to the test polarity inversion signal TPOL input via the external terminal TM.

Therefore, at the time of the test before the product shipment for the source driver 10, the operation mode signal TES representing the test mode is supplied to the source driver 10 via the external terminal TM.

As a result, instead of the polarity inversion signal POL generated by the TCON 12, the polarity of each drive voltage V1 to Vn is switched by the test polarity inversion signal TPOL input from the external terminal TM. That is, by using the test polarity inversion signal TPOL, the polarity of each drive voltage V1 to Vn output from the source driver 10 may be set to the polarity intended by the test performer.

Therefore, the test performer may specify the expected value of each drive voltage V1 to Vn that will be output from the source driver 10 without resetting the source driver 10 in the test preparation stage.

Therefore, according to the source driver 10, it is possible to shorten the test time compared with a source driver which needs to be reset at the test preparation stage and then reset each FF and register group in order to specify the expected value.

Second Embodiment

Figure 4:
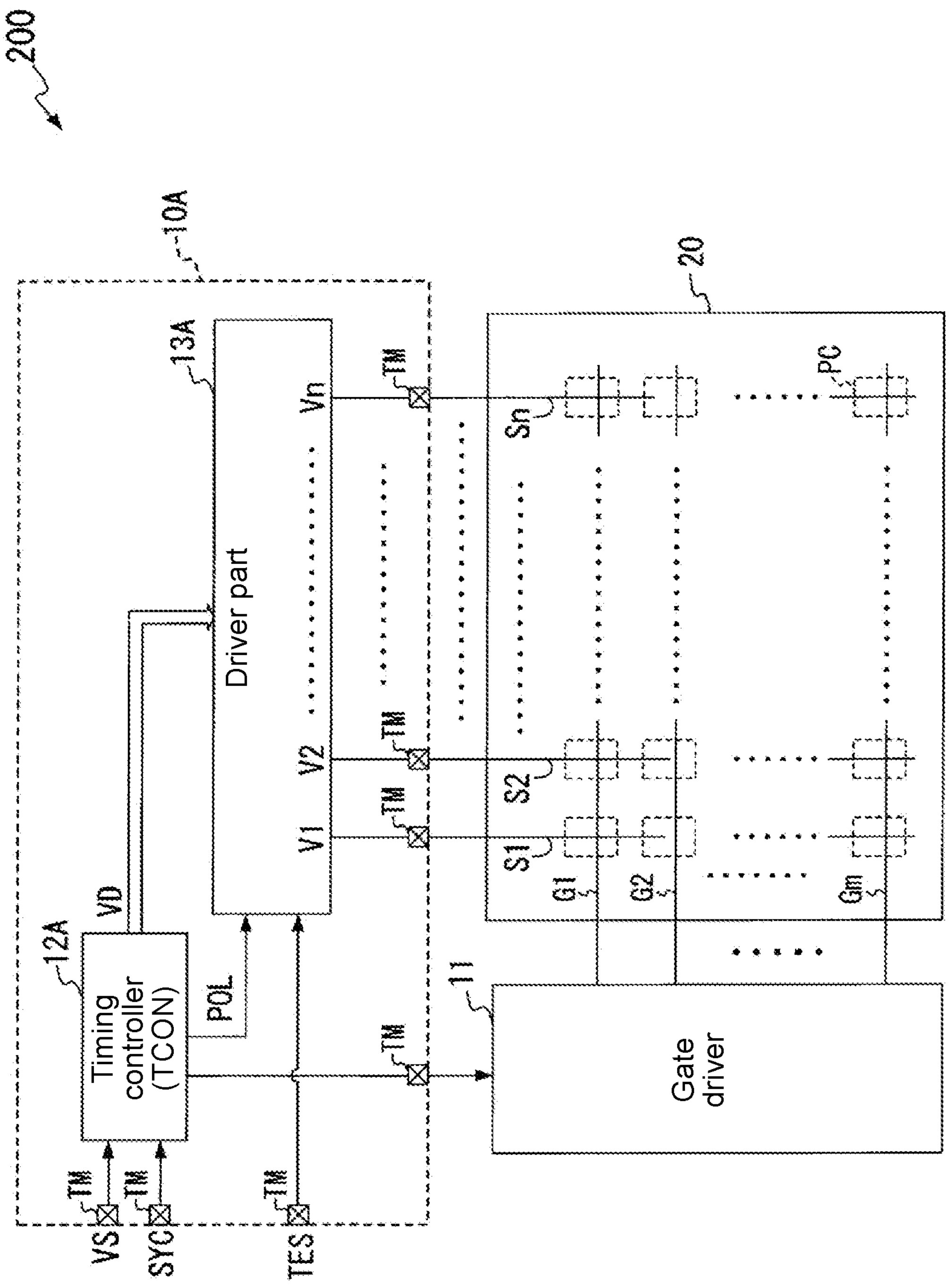
FIG. 4 is a block diagram showing a configuration of a display device 200 as a second embodiment of a display device including a display driver according to the disclosure.

FIG. 4 is a block diagram showing a configuration of a display device 200 as a second embodiment of a display device including a display driver according to the disclosure.

In the configuration shown in FIG. 4, a source driver 10A is used instead of the source driver 10 shown in FIG. 1. At this time, since the gate driver 11 and the display panel 20 are the same as those shown in FIG. 1, the description thereof will be omitted.

The source driver 10A is formed on a single or multiple semiconductor IC chips, and receives an image signal VS, a synchronization signal (horizontal and vertical synchronization signal) SYC, and an operation mode signal TES from the outside of the semiconductor IC chip via multiple external terminals TM formed on the semiconductor IC chip.

Like the source driver 10, the source driver 10A supplies a horizontal synchronization signal representing the timing for each horizontal scanning period to the gate driver 11 via the external terminal TM according to the synchronization signal SYC.

Further, the source driver 10A generates drive voltages V1 to Vn having voltage values corresponding to the brightness levels of each pixel for each horizontal scanning period according to the image signal VS and the synchronization signal SYC, and supplies each of them to the source lines S1 to Sn of the display panel 20 via the external terminal TM.

As shown in FIG. 4, in the display device 200, the source driver 10A includes a timing controller (TCON) 12A and a driver part 13A.

The TCON 12A generates a binary signal, in which, for example, the state of logic level 1 representing an odd frame and the state of logic level 0 representing an even frame are alternately switched for each frame display period at a timing synchronized with the synchronization signal SYC, as a polarity inversion signal POL which prompts polarity inversion, and supplies it to the driver part 13A.

Further, the TCON 12A supplies to the driver part 13A an image data signal VD including a display data signal, a horizontal and vertical synchronization signal, a data enable signal, a clock signal, and the like, which are based on the image signal VS and the synchronization signal SYC and include a series of display data pieces representing the brightness level of each pixel, for example, in 8 bits. Further, the TCON 12A supplies the horizontal synchronization signal to the gate driver 11 via the external terminal TM.

Further, the TCON 12A receives an input operation for setting a test polarity inversion signal TPOL to the state of logic level 0 or 1, and inserts the test polarity inversion signal TPOL having a logic level (0 or 1) set by this input operation into the image data signal VD.

Figure 5:
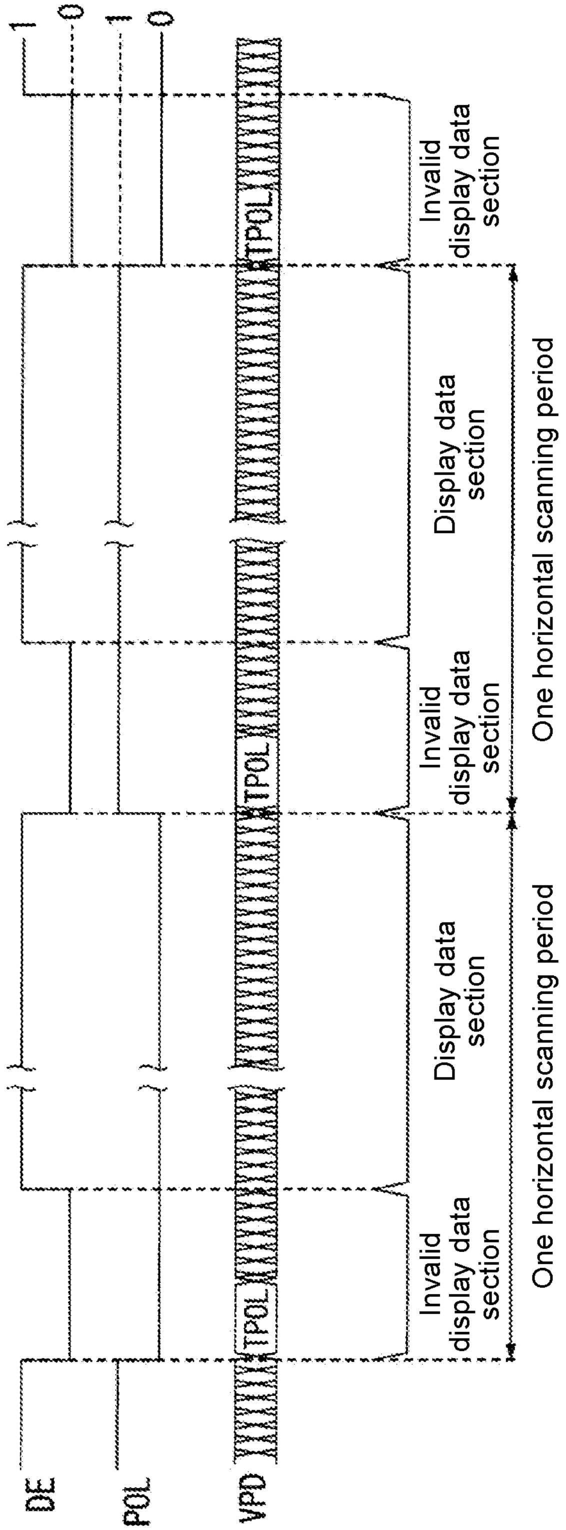
FIG. 5 is a diagram showing an example of waveforms of a data enable signal DE, a polarity inversion signal POL, and a display data signal VPD.

FIG. 5 is a time chart showing forms of the data enable signal (denoted by DE) and the display data signal (denoted by VPD) included in the image data signal VD, as well as a form of the polarity inversion signal POL described above.

As shown in FIG. 5, the data enable signal DE is a binary signal in which the state of logic level 0 state represents an invalid display data section and the state of logic level 1 represents a display data section within one horizontal scanning period for each horizontal scanning period. At this time, in the display data signal VPD, the data piece included in the display data section shown in FIG. 5 is valid data as display data, and the data piece included in the invalid display data section shown in FIG. 5 is invalid data as display data.

Here, as shown in FIG. 5, a test polarity inversion signal TPOL representing the logic level 0 or 1 is included in the head part of the invalid display data section in the display data signal VPD. The test polarity inversion signal TPOL is a binary signal (0 or 1) inserted into an invalid display data section in the display data signal VPD included in the image data signal VD by the TCON 12A that has received an input operation (logic level 0 or 1) from the test performer. For example, the test performer performs an input operation of logic level 1 when specifying an odd frame and logic level 0 when specifying an even frame as the test polarity inversion signal TPOL.

The driver part 13A receives the image data signal VD and the polarity inversion signal POL as described above transmitted from the TCON 12A, and also receives the operation mode signal TES from the outside of the semiconductor IC chip via the external terminal TM.

Further, the operation mode signal TES is a binary (logic level 0 or 1) signal representing a normal mode in which the source driver 10A is normally operated or a test mode in which a test before product shipment is performed. For example, when the operation mode signal TES has a logic level 0, it represents the normal mode, and when it has a logic level 1, it represents the test mode.

Figure 6:
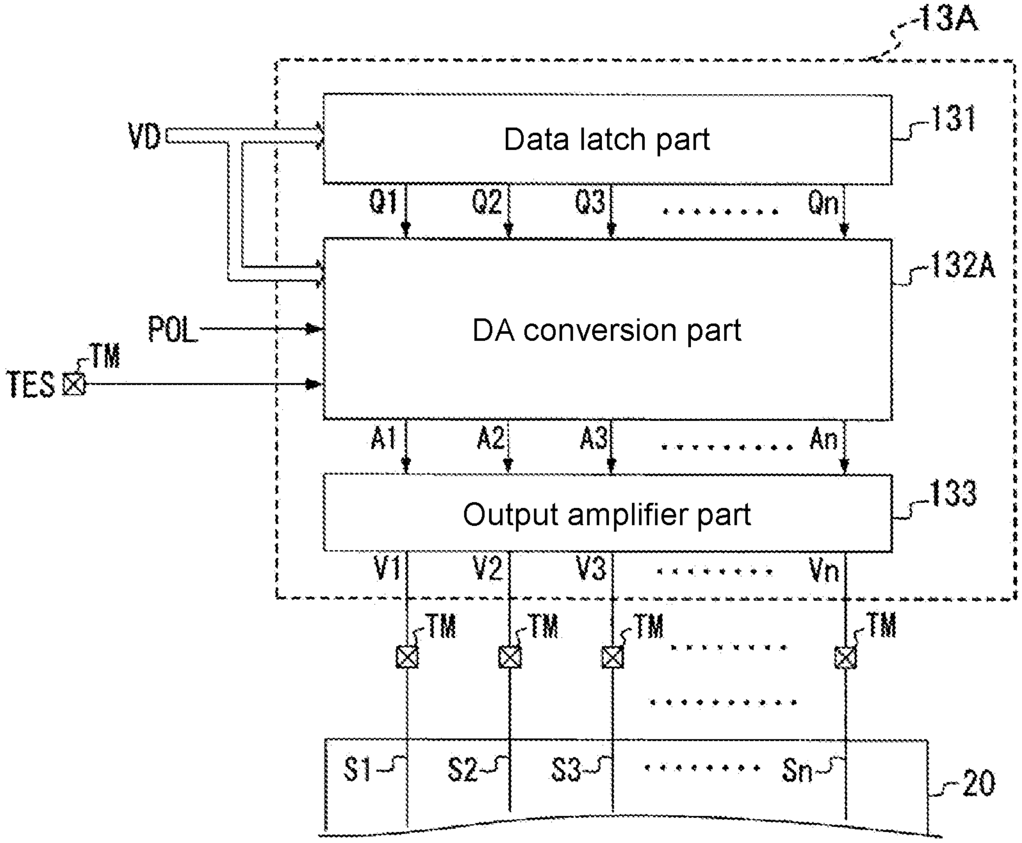
FIG. 6 is a block diagram showing an internal configuration of the driver part 13A.

FIG. 6 is a block diagram showing an internal configuration of the driver part 13A.

As shown in FIG. 6, the driver part 13A includes a data latch part 131, a DA conversion part 132A, and an output amplifier part 133.

The data latch part 131 captures a series of display data pieces in the display data section in the display data signal VPD shown in FIG. 5 included in the image data signal VD according to the clock signal and the data enable signal included in the image data signal VD. Then, each time the data latch part 131 captures n display data pieces for one horizontal scanning period, the data latch part 131 supplies each piece of the display data Q1 to Qn to the DA conversion part 132A.

The DA conversion part 132A converts each piece of the display data Q1 to Qn into a gradation voltage having a voltage value corresponding to the brightness level represented by each, and supplies the gradation voltages to the output amplifier part 133 as gradation voltages A1 to An. Further, when the operation mode signal TES represents the normal mode, the DA conversion part 132A switches the polarity of each gradation voltage for each frame according to the polarity inversion signal POL supplied from the TCON 12A. In addition, when the operation mode signal TES represents the test mode, the DA conversion part 132A switches the polarity of each gradation voltage according to the test polarity inversion signal TPOL included in the image data signal VD.

The output amplifier part 133 outputs n voltages obtained by individually amplifying the gradation voltages A1 to An as drive voltages V1 to Vn to the source lines S1 to Sn of the display panel 20 via each of the corresponding external terminals TM.

The internal configuration of the DA conversion part 132A will be described below.

Figure 7:
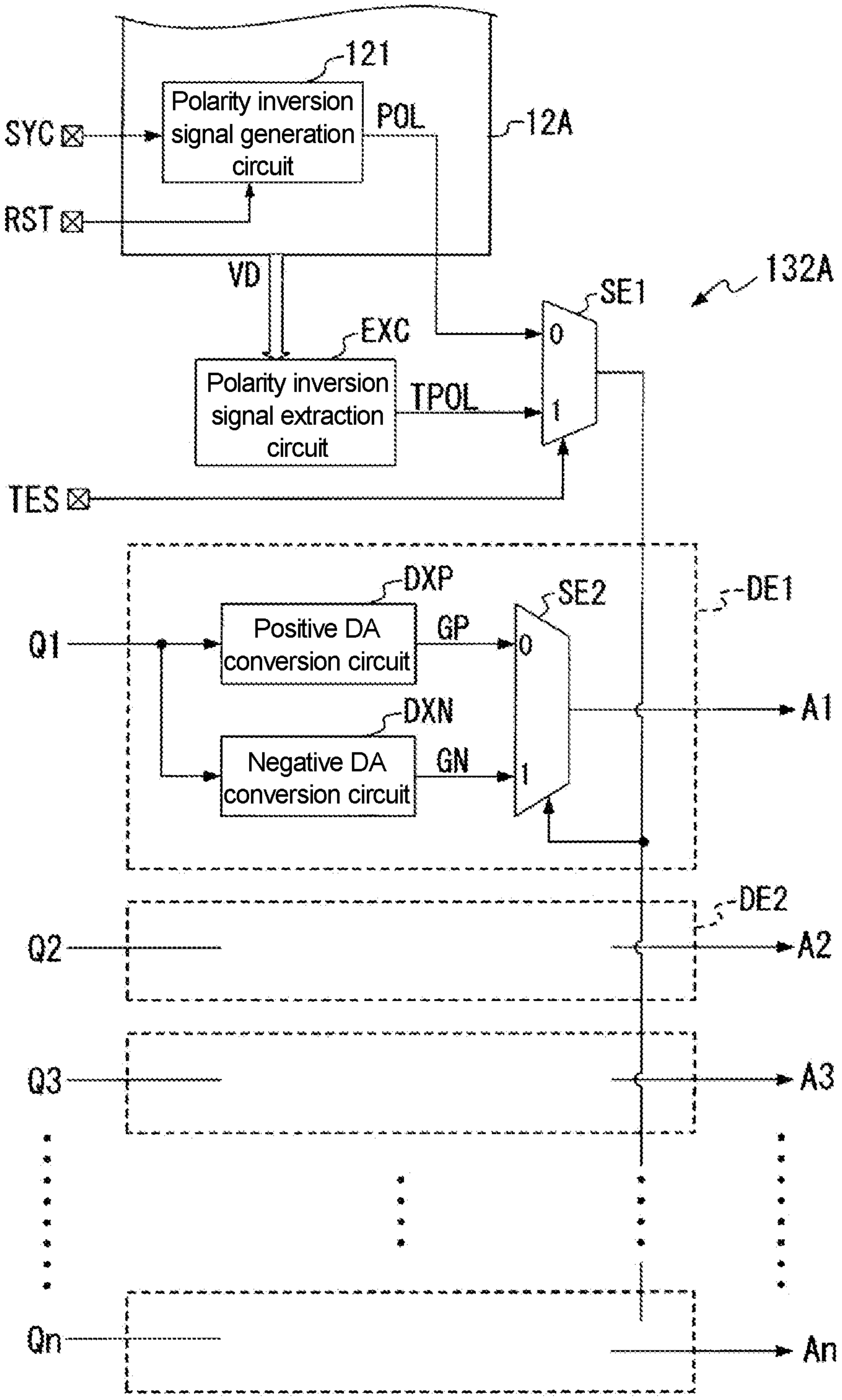
FIG. 7 is a block diagram showing an internal configuration of the DA conversion part 132A.

FIG. 7 is a block diagram showing an example of an internal configuration of the DA conversion part 132A.

As shown in FIG. 7, the DA conversion part 132A includes a polarity inversion signal extraction circuit EXC, a selector SE1 and conversion blocks DE1 to DEn provided corresponding to the display data Q1 to Qn, respectively.

The selector SE1 receives the polarity inversion signal POL generated by the TCON 12A at the input terminal 0.

The TCON 12A includes, for example, a TFF, a counter, or the like, and includes a polarity inversion signal generation circuit 121 that generates the polarity inversion signal POL. That is, the polarity inversion signal generation circuit 121 generates a polarity inversion signal POL that alternately repeats the states of logic level 0 and logic level 1 for each frame period as shown in FIG. 5 in synchronization with the synchronization signal SYC supplied via the external terminal, and supplies it to the input terminal 0 of the selector SE1. Further, the polarity inversion signal generation circuit 121 initializes its own internal state according to the reset signal RST supplied via the external terminal, and initializes the state of the polarity inversion signal POL to one of the logic level 0 and the logic level 1.

The polarity inversion signal extraction circuit EXC receives the image data signal VD, and extracts the test polarity inversion signal TPOL included in the invalid display data section of the display data signal VPD, as shown in FIG. 5, from the image data signal VD. For example, the polarity inversion signal extraction circuit EXC counts the number of clock signal pulses from the time of the rising or falling edge of the data enable signal ED shown in FIG. 5, and obtains the test polarity inversion signal TPOL by capturing the display data signal VPD when the count value reaches a predetermined value. Then, the polarity inversion signal extraction circuit EXC supplies the extracted test polarity inversion signal TPOL to the input terminal 1 of the selector SE1.

When the operation mode signal TES represents the normal mode, the selector SE1 selects the polarity inversion signal POL from the polarity inversion signal POL and the test polarity inversion signal TPOL and outputs the polarity inversion signal POL. In addition, when the operation mode signal TES represents the test mode, the selector SE1 selects the test polarity inversion signal TPOL from the polarity inversion signal POL and the test polarity inversion signal TPOL and outputs the test polarity inversion signal TPOL. The polarity inversion signal POL or the test polarity inversion signal TPOL output from the selector SE1 is supplied to each of the conversion blocks DE1 to DEn.

Each of the conversion blocks DE1 to DEn includes the same internal configuration, that is, a positive DA conversion circuit DXP, a negative DA conversion circuit DXN, and a selector SE2, and by such a configuration, the display data Qx (x is an integer of 1 to n) received by each is converted into a gradation voltage Ax and output.

That is, the positive DA conversion circuit DXP converts the display data Qx into a positive gradation voltage GP having a positive voltage value corresponding to the brightness level represented by the display data Qx, and supplies it to the selector SE2.

The negative DA conversion circuit DXN converts the display data Qx into a negative gradation voltage GN having a negative voltage value corresponding to the brightness level represented by the display data Qx, and supplies it to the selector SE2.

The selector SE2 selects one of the positive gradation voltage GP and the negative gradation voltage GN based on the polarity inversion signal POL or the test polarity inversion signal TPOL output from the selector SE1, and outputs it as the gradation voltage Ax. For example, the selector SE2 selects the positive gradation voltage GP when the polarity inversion signal POL or the test polarity inversion signal TPOL represents an odd frame, and selects the negative gradation voltage GN when the polarity inversion signal POL or the test polarity inversion signal TPOL represents an even frame, and outputs the selected one as the gradation voltage Ax.

With the above configuration, in the DA conversion part 132, when the display data Q1 to Qn are converted into the gradation voltages A1 to An, and when the operation mode signal TES represents the normal mode, the polarities of the gradation voltages A1 to An are switched for each frame display period according to the polarity inversion signal POL generated by the TCON 12A.

In addition, when the operation mode signal TES represents the test mode, the DA conversion part 132A switches the polarity of each gradation voltage A1 to An according to the test polarity inversion signal TPOL included in the image data signal VD.

Therefore, at the time of the test before the product shipment for the source driver 10A, the operation mode signal TES representing the test mode is supplied to the external terminal TM of the source driver 10A.

As a result, instead of the polarity inversion signal POL generated by the TCON 12A, the polarity of each drive voltage V1 to Vn is switched by the test polarity inversion signal TPOL included in the image data signal VD (VPD). That is, by the test polarity inversion signal TPOL inserted into the image data signal VD (VPD) by the input operation of the test performer, the polarity of each drive voltage V1 to Vn output from the source driver 10A may be set to the polarity intended by the test performer.

Therefore, the test performer may specify the expected value of each drive voltage V1 to Vn that will be output from the source driver 10A without resetting the source driver 10A in the test preparation stage.

Therefore, according to the source driver 10A, it is possible to shorten the test time compared with a source driver which needs to be reset at the test preparation stage and then reset each FF and register group in order to specify the expected value.

Further, according to the source driver 10A, since an external terminal for inputting the test polarity inversion signal TPOL, which is required in the configuration shown in FIG. 1, is not required, the size of the device may be reduced.

In the above embodiments, the test polarity inversion signal TPOL is directly received from the external terminal or inserted into the image data signal and extracted from the image data signal, but the test polarity inversion signal TPOL having any logic level may be generated according to the transition of the state of the operation mode signal TES from representing the normal mode to representing the test mode.

Further, in the above embodiments, the selector SE1 is provided inside the DA conversion part 132, but the selector SE1 may be provided outside the DA conversion part 132.

In short, the display driver (10, 10A) according to the disclosure may have any configuration as long as it includes the following: a polarity inversion signal generation circuit, a first external terminal that receives an operation mode signal (TES) representing a test mode or a normal mode, a conversion part, and a first selector.

The polarity inversion signal generation circuit (121) generates a polarity inversion signal (POL) that prompts polarity inversion for each frame display period according to the image signal.

The conversion part (132, 132A) converts first to n-th (n is an integer of 2 or more) display data pieces (Q1 to Qn) representing the brightness level of each pixel based on the image signal into first to n-th gradation voltages (A1 to An) each having a voltage value corresponding to the brightness level, and outputs them.

The first selector (SE1) receives a test polarity inversion signal (TPOL) and a polarity inversion signal (POL) for prompting polarity inversion; selects and outputs the polarity inversion signal when the operation mode signal represents a normal mode, and selects and outputs the test polarity inversion signal when the operation mode signal represents a test mode. Here, the conversion part inverts the polarity of the voltage value of each of the output first to n-th gradation voltages according a signal output by the first selector from among the test polarity inversion signal and the polarity inversion signal.

What is claimed is:

1. A display driver comprising:

a conversion part which converts first to n-th display data pieces representing a brightness level of each pixel based on an image signal into first to n-th gradation voltages each having a voltage value corresponding to the brightness level, and outputs the first to n-th gradation voltages, where n is an integer of 2 or more;

a polarity inversion signal generation circuit which generates a polarity inversion signal for prompting polarity inversion for a frame display period according to the image signal;

a first external terminal which receives an operation mode signal representing a test mode or a normal mode; and a first selector which receives the operation mode signal from the first external terminal, a test polarity inversion signal for prompting polarity inversion and the polarity inversion signal, wherein the first selector selects and outputs the polarity inversion signal when the operation mode signal represents the normal mode, and the first selector selects and outputs the test polarity inversion signal when the operation mode signal represents the test mode, wherein the test polarity inversion signal is independent from the polarity inversion signal, wherein the conversion part inverts a polarity of the voltage value of each of the output first to n-th gradation voltages according to a signal output by the first selector from among the test polarity inversion signal and the polarity inversion signal.

2. The display driver according to claim 1, further comprising a second external terminal which receives the test polarity inversion signal from outside.

3. The display driver according to claim 1, further comprising:

a control part which generates an image data signal including a series of display data pieces representing the brightness level of each pixel based on the image signal, receives an input operation for setting a state of the test polarity inversion signal to a logic level 0 or a logic level 1, and inserts the test polarity inversion signal set by the input operation into the image data signal;

a data latch part which captures the series of the display data pieces included in the image data signal and supplies each of n display data pieces as the first to n-th display data pieces to the conversion part at each time of capturing; and a polarity inversion signal extraction circuit which extracts the test polarity inversion signal from the image data signal and supplies the test polarity inversion signal to the first selector.

4. The display driver according to claim 3, wherein the control part inserts the test polarity inversion signal into an invalid data section in the image data signal for the frame display period in the image data signal.

5. The display driver according to claim 1, wherein the conversion part comprises first to n-th conversion blocks that individually receives the first to n-th display data pieces and outputs the first to n-th gradation voltages, wherein the first to n-th conversion blocks each comprise:

a positive conversion circuit which converts the display data piece into a positive gradation voltage having a positive voltage value corresponding to the brightness level;

a negative conversion circuit which converts the display data piece into a negative gradation voltage having a negative voltage value corresponding to the brightness level; and a second selector which receives the positive gradation voltage and the negative gradation voltage, and outputs one of the positive gradation voltage and the negative gradation voltage as the gradation voltage according to the signal output by the first selector.

6. The display driver according to claim 2, wherein the conversion part comprises first to n-th conversion blocks that individually receives the first to n-th display data pieces and outputs the first to n-th gradation voltages, wherein the first to n-th conversion blocks each comprise:

a positive conversion circuit which converts the display data piece into a positive gradation voltage having a positive voltage value corresponding to the brightness level;

a negative conversion circuit which converts the display data piece into a negative gradation voltage having a negative voltage value corresponding to the brightness level; and a second selector which receives the positive gradation voltage and the negative gradation voltage, and outputs one of the positive gradation voltage and the negative gradation voltage as the gradation voltage according to the signal output by the first selector.

7. The display driver according to claim 3, wherein the conversion part comprises first to n-th conversion blocks that individually receives the first to n-th display data pieces and outputs the first to n-th gradation voltages, wherein the first to n-th conversion blocks each comprise:

a positive conversion circuit which converts the display data piece into a positive gradation voltage having a positive voltage value corresponding to the brightness level;

a negative conversion circuit which converts the display data piece into a negative gradation voltage having a negative voltage value corresponding to the brightness level; and a second selector which receives the positive gradation voltage and the negative gradation voltage, and outputs one of the positive gradation voltage and the negative gradation voltage as the gradation voltage according to the signal output by the first selector.

8. The display driver according to claim 4, wherein the conversion part comprises first to n-th conversion blocks that individually receives the first to n-th display data pieces and outputs the first to n-th gradation voltages, wherein the first to n-th conversion blocks each comprise:

a positive conversion circuit which converts the display data piece into a positive gradation voltage having a positive voltage value corresponding to the brightness level;

a negative conversion circuit which converts the display data piece into a negative gradation voltage having a negative voltage value corresponding to the brightness level; and a second selector which receives the positive gradation voltage and the negative gradation voltage, and outputs one of the positive gradation voltage and the negative gradation voltage as the gradation voltage according to the signal output by the first selector.

9. A display device comprising:

a display panel comprising first to n-th source lines, where n is an integer of 2 or more; and a display driver which generates first to n-th drive voltages based on an image signal and supplies the first to n-th drive voltages to the first to n-th source lines of the display panel, wherein the display driver comprises:

a conversion part which converts first to n-th display data pieces representing a brightness level of each pixel based on the image signal into first to n-th gradation voltages each having a voltage value corresponding to the brightness level, and outputs the first to n-th gradation voltages;

an output amplifier part which generates n voltages obtained by amplifying each of the first to n-th gradation voltages as the first to n-th drive voltages;

a polarity inversion signal generation circuit which generates a polarity inversion signal for prompting polarity inversion for a frame display period according to the image signal;

a first external terminal which receives an operation mode signal representing a test mode or a normal mode; and a first selector which receives the operation mode signal from the first external terminal, a test polarity inversion signal for prompting polarity inversion and the polarity inversion signal, wherein the first selector selects and outputs the polarity inversion signal when the operation mode signal represents the normal mode, and the first selector selects and outputs the test polarity inversion signal when the operation mode signal represents the test mode, wherein the test polarity inversion signal is independent from the polarity inversion signal, wherein the conversion part inverts a polarity of the voltage value of each of the output first to n-th gradation voltages according to a signal output by the first selector from among the test polarity inversion signal and the polarity inversion signal.

* * * * *